(12) United States Patent
Moravec et al.

(10) Patent No.: US 10,902,239 B2
(45) Date of Patent: *Jan. 26, 2021

(54) METHODS AND SYSTEMS FOR TRAINING AN OBJECT DETECTION ALGORITHM USING SYNTHETIC IMAGES

(71) Applicant: SEIKO EPSON CORPORATION, Tokyo (JP)

(72) Inventors: Ivo Moravec, Richmond Hill (CA); Jie Wang, Markham (CA); Syed Alimul Huda, Scarborough (CA)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,750

(22) Filed: Sep. 17, 2019

(65) Prior Publication Data

US 2020/0012846 A1 Jan. 9, 2020

Related U.S. Application Data

(63) Continuation of application No. 15/839,247, filed on Dec. 12, 2017, now Pat. No. 10,552,665.

(51) Int. Cl.
*G06K 9/00* (2006.01)
*G06T 19/00* (2011.01)
(Continued)

(52) U.S. Cl.
CPC ..... *G06K 9/00201* (2013.01); *G06K 9/00671* (2013.01); *G06K 9/6262* (2013.01);
(Continued)

(58) Field of Classification Search
CPC ....... G06T 2200/04; G06T 2207/10004; G06T 2207/10012; G06T 2207/10021
See application file for complete search history.

(56) References Cited

U.S. PATENT DOCUMENTS 6,116,640 A 9/2000 Tanaka et al.
7,474,775 B2 * 1/2009 Abramoff ............ G06K 9/6277
351/206

(Continued)

FOREIGN PATENT DOCUMENTS

JP 2011-129082 A 6/2011
JP 2013-050947 A 3/2013

OTHER PUBLICATIONS

Oct. 28, 2019 U.S. Office Action issued U.S. Appl. No. 15/451,752.
(Continued)

*Primary Examiner* — Yosef Kassa
(74) *Attorney, Agent, or Firm* — Oliff PLC

(57) ABSTRACT

A non-transitory computer readable medium embodies instructions that cause one or more processors to perform a method. The method includes: (A) receiving a selection of a 3D model stored in one or more memories, the 3D model corresponding to an object, and (B) setting a camera parameter set for a camera for use in detecting a pose of the object in a real scene. The method also includes (C) receiving a selection of data representing a view range, (D) generating at least one 2D synthetic image based on the camera parameter set by rendering the 3D model in the view range, (E) generating training data using the at least one 2D synthetic image to train an object detection algorithm, and (F) storing the generated training data in one or more memories.

14 Claims, 6 Drawing Sheets

(51) Int. Cl.
*G06T 7/70* (2017.01)
*G06K 9/62* (2006.01)

(52) U.S. Cl.
CPC .............. *G06T 7/70* (2017.01); *G06T 19/006* (2013.01); *G06T 2207/20081* (2013.01)

(56) References Cited

U.S. PATENT DOCUMENTS

| | | | |
|---|---|---|---|
| 7,551,673 B1* | 6/2009 | Oh .................... | H04N 19/56 348/413.1 |
| 7,889,193 B2 | 2/2011 | Platonov et al. | |
| 8,155,195 B2* | 4/2012 | Regunathan ......... | H04N 19/567 375/240.16 |
| 8,379,940 B2* | 2/2013 | Wechsler ............. | G06K 9/6228 382/118 |
| 8,386,446 B1 | 2/2013 | Pasupathy et al. | |
| 8,498,984 B1 | 7/2013 | Hwang et al. | |
| 8,578,299 B2 | 11/2013 | Chen et al. | |
| 8,594,375 B1 | 11/2013 | Padwick | |
| 8,605,944 B2* | 12/2013 | Emoto ................. | H04N 7/181 382/103 |
| 8,768,071 B2* | 7/2014 | Tsuchinaga ......... | G06K 9/6857 382/227 |
| 8,780,110 B2 | 7/2014 | Ben Himane et al. | |
| 8,873,813 B2* | 10/2014 | Tadayon ............. | G06K 9/00288 382/118 |
| 9,002,098 B1 | 4/2015 | Chelian et al. | |
| 9,111,347 B2 | 8/2015 | Ben Himane | |
| 9,330,491 B2 | 5/2016 | Wang et al. | |
| 9,875,427 B2 | 1/2018 | Medasani et al. | |
| 10,373,380 B2 | 8/2019 | Kutliroff et al. | |
| 2009/0096790 A1 | 4/2009 | Wiedemann et al. | |
| 2011/0002531 A1 | 1/2011 | Heisele et al. | |
| 2012/0314096 A1 | 12/2012 | Kruglick | |
| 2013/0051626 A1 | 2/2013 | Abadpour et al. | |
| 2013/0218530 A1 | 8/2013 | Deichmann et al. | |
| 2014/0079314 A1 | 3/2014 | Yakubovich et al. | |
| 2014/0098100 A1 | 4/2014 | Dane et al. | |
| 2015/0154786 A1 | 6/2015 | Furukawa et al. | |
| 2015/0161457 A1 | 6/2015 | Hayakawa et al. | |
| 2017/0053447 A1 | 2/2017 | Chen et al. | |
| 2017/0214899 A1 | 7/2017 | Meier et al. | |
| 2018/0182071 A1 | 6/2018 | Ayari et al. | |
| 2018/0253593 A1 | 9/2018 | Hu et al. | |

OTHER PUBLICATIONS

Jan. 13, 2020, Office Action issued U.S. Appl. No. 15/949,728.
Feb. 26, 2020 Notice of Allowance issued in U.S. Appl. No. 15/451,752.
Dec. 18, 2019 Notice of Allowance issued in U.S. Appl. No. 16/123,372.
Mar. 11, 2020 Office Action Issued in U.S. Appl. No. 15/951,840.
Oct. 3, 2019 Office Action issued in U.S. Appl. No. 15/951,840.
Konishi et al; "Fast 6D Object Pose Estimation from a Monolcular Image using Hierarchical Pose Trees;" OMRON Corportaion; 2016; 1 page.
Peng; "Combine color and shape in real-time detection of texture-less objects;" Computer Vision and Image Understanding; vol. 135; 2015; pp. 31-48.
U.S. Appl. No. 15/839,247, filed Dec. 12, 2017 in the name of Moravec et al.
U.S. Appl. No. 15/875,579, filed Jan. 19, 2018 in the name of Szeto et al.
U.S. Appl. No. 15/451,752, filed Mar. 7, 2017 in the name of Lam et al.
U.S. Appl. No. 15/951,840, filed Apr. 12, 2018 in the name of Ahmed et al.
U.S. Appl. No. 15/949,728, filed Apr. 10, 2018 in the name of Mukherjee et al.
U.S. Appl. No. 16/123,372, filed Sep. 6, 2018 in the name of Brusnitsyn.
Oct. 19, 2018 Office Action issued in U.S. Appl. No. 15/451,752.
Apr. 19, 2019 Office Action issued in U.S. Appl. No. 15/875,579.
Apr. 15, 2019 Office Action issued in U.S. Appl. No. 15/451,752.
Jaramillo et al. "6-DoF Pose Localization in 3D Point-Cloud Dense Maps Using a Monocular Camera." Proceedings of ROBIO 2013—IEEE International Conference on Robotics and Biomimetics, Institute of Electrical and Electronics Engineers, Dec. 2013, pp. 1747-1752.
Jun. 26, 2019 Notice of Allowance issued in U.S. Appl. No. 15/839,247.
Sep. 11, 2019 Notice of Allowance issued in U.S. Appl. No. 15/839,247.

* cited by examiner

METHODS AND SYSTEMS FOR TRAINING AN OBJECT DETECTION ALGORITHM USING SYNTHETIC IMAGES

This application is a continuation application of U.S. patent application Ser. No. 15/839,247, filed on Dec. 12, 2017, the disclosure of which is hereby incorporated by reference in its entirety.

BACKGROUND

1. Technical Field

The disclosure relates generally to the field of training object detection algorithms, and more specifically to methods and systems for training object detection algorithms using synthetic two-dimensional (2D) images.

2. Related Art

Augmented Reality (AR) has become increasingly common with the advancement of computer technology. A general definition of AR is capturing a real-world scene and adding artificial (virtual) elements using software. This can enhance a user's perception of the real world or provide entertainment to the user.

Object tracking is used in many AR implementations. In object tracking, a real-world object is "followed" by an artificial object, such as computer-graphics enhancements or an information bubble (as perceived by the user). In other words, if the real-world object moves or the user's view moves relative to the real-world object, the artificial object will remain in the same location relative to the real-world object and/or the content of the artificial object will be determined based on the movement and/or new location of the real-world object. Location tracking is also used in many AR implementations. In location tracking, a virtual object will stay in one location in the scene, regardless of the movement of the user.

One platform for implementing AR is the smartphone. The presence of a camera, display device, and processor on the same device allows for software to easily add artificial elements to a live scene captured by the camera. Moreover, the presence of motion sensors and locators (e.g. accelerometers and GPS) on these devices is exploited by the software to better implement AR.

Although smartphones provide a simple and convenient platform for implementing AR, they do not provide a very immersive experience for the user. This is because the user's eyes are spatially separated from the smartphone, and instead of perceiving the environment with their own eyes, they are viewing the scene as captured by the camera.

SUMMARY

To improve on the AR experience, the transparent head-mounted display (HMD) can implement AR. These systems are usually glasses with prisms placed in front of the eyes. The user views the scene directly through the glasses. The prisms allow for artificial images to be overlaid on the scene as perceived by the user. Meanwhile, the HMD collects data from the scene using a camera.

3D pose estimation is an important technology with many applications, including the fields of AR, VR and robotics.

Trackers commonly utilize an initialization method to first start tracking and to re-start tracking in case of tracking loss. This may require estimating the pose of an object from an image without prior history, a technology sometimes referred to as object detection and pose estimation (ODPE).

Object detection algorithms are commonly trained to recognize specific objects using images of the object captured with a camera that is to be used for the AR system. In at least some known systems, the initial stages of the training process are time consuming and performed manually. In such manual training, a trainer positions the object, captures numerous images of the object from numerous different angles of view using the camera of the AR system, and uploads the images to a training computer. Using the training computer, the trainer aligns a three-dimensional (3D) model of the object to the image of the object in each captured image.

An advantage of some aspects of the disclosure is to solve at least a part of the problems described above, and aspects of the disclosure can be implemented as the following aspects.

One aspect of the disclosure is a non-transitory computer readable medium that embodies instructions that cause one or more processors to perform a method. The method includes: (A) receiving a selection of a 3D model stored in one or more memories, the 3D model corresponding to an object, and (B) setting a camera parameter set for a camera for use in detecting a pose of the object in a real scene. Setting the camera parameter set includes receiving information identifying an Augmented-Reality (AR) device including the camera, and acquiring, based at least in part on the information identifying the AR device, the camera parameter set for the camera from a plurality of the camera parameter sets stored in one or more memories. Each camera parameter set of the plurality of camera parameter sets is associated in the one or more memories with at least one AR device of a plurality of different AR devices. The method also includes (C) generating at least one 2D synthetic image based on the camera parameter set by rendering the 3D model in a view range, (D) generating training data using the at least one 2D synthetic image to train an object detection algorithm, and (E) storing the generated training data in one or more memories.

Another aspect of the present disclosure is a non-transitory computer readable medium that embodies instructions that cause one or more processors to perform a method. The method includes: (A) receiving a selection of a 3D model stored in one or more memories, the 3D model corresponding to an object, and (B) setting a camera parameter set for a camera for use in detecting a pose of the object in a real scene. Setting the camera parameter set includes acquiring, through a data connection, the camera parameter set from an Augmented-Reality (AR) device that includes the camera when the AR device becomes accessible by the one or more processors through the data connection. The method also includes (C) generating at least one 2D synthetic image based on the camera parameter set by rendering the 3D model in a view range, (D) generating training data using the at least one 2D synthetic image to train an object detection algorithm, and (E) storing the generated training data in one or more memories.

A further aspect of this disclosure is a non-transitory computer readable medium that embodies instructions that cause one or more processors to perform a method. The method includes: (A) receiving a selection of a 3D model stored in one or more memories, the 3D model corresponding to an object, and (B) setting a camera parameter set for a camera for use in detecting a pose of the object in a real scene. The method also includes (C) receiving a selection of data representing a view range, (D) generating at least one 2D synthetic image based on the camera parameter set by rendering the 3D model in the view range, (E) generating training data using the at least one 2D synthetic image to train an object detection algorithm, and (F) storing the generated training data in one or more memories.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

The disclosure relates generally to training object detection algorithms, and more specifically to methods and systems for training object detection algorithms using synthetic two-dimensional (2D) images.

In some embodiments, the trained object detection algorithm is used by an object detection device, such as an AR device. Some example systems include and/or interface with an AR device. In still other embodiments, the methods described herein for training an object detection algorithm are performed by the AR device itself.

The AR device may be, for example, an HMD. An example HMD suitable for use with the methods and systems described herein will be described with reference to FIGS. 1 and 2.

Figure 1:
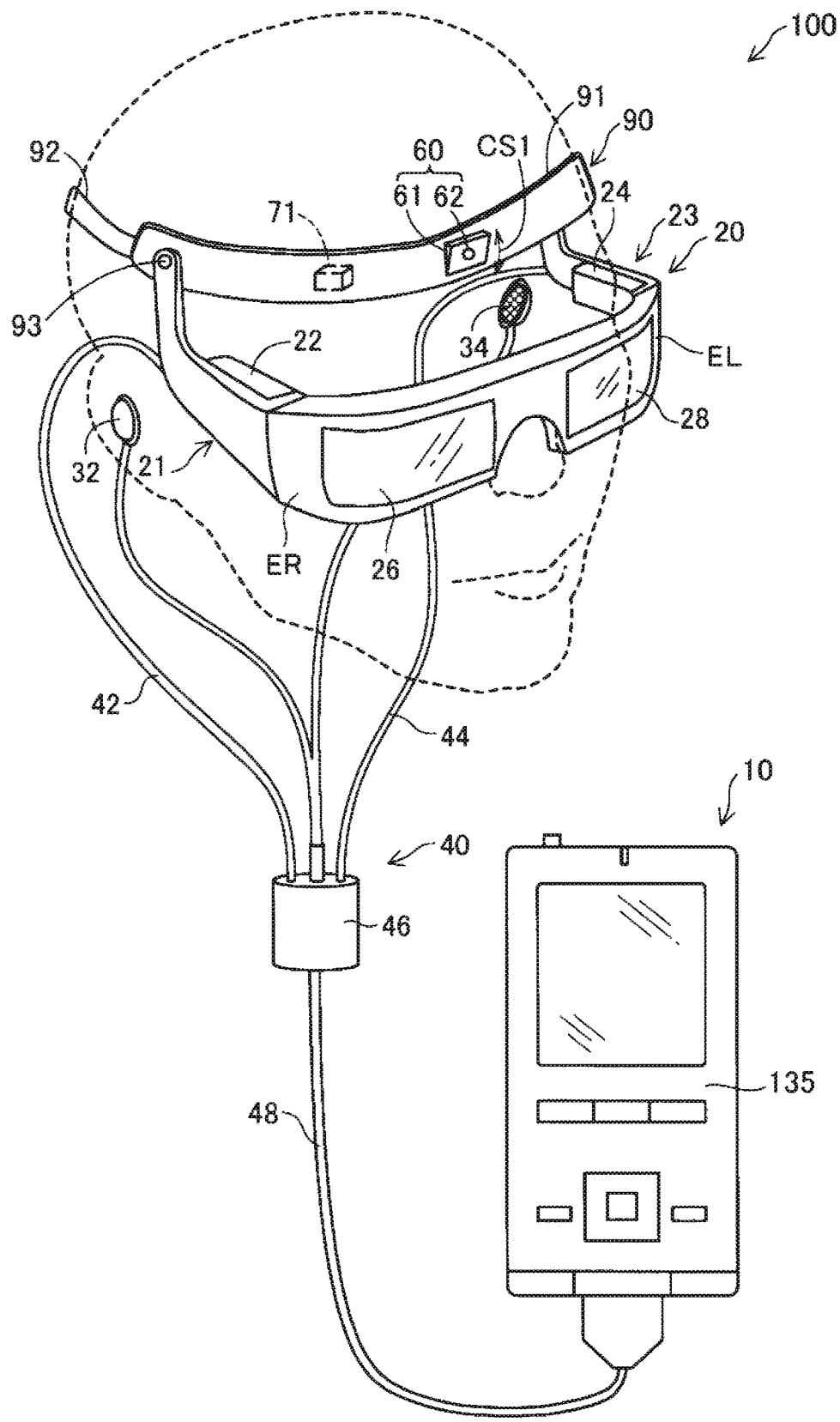
FIG. 1 is a diagram illustrating a schematic configuration of an example HMD.

FIG. 1 is a schematic configuration of an HMD 100. The HMD 100 is a head-mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (Inertial Measurement Unit) 71. The wearing base section 91 has a shape curved along the form of the frontal region of a person's forehead. The belt 92 is worn around the head of the user.

The camera 60 functions as an imaging section. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base section 61 that rotates with respect to the wearing base section 91 and a lens section 62, a relative position of which is fixed with respect to the camera base section 61. The camera base section 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens section 62, which is the optical axis of the camera 60, can be changed in the range of the arrow CS1. The lens section 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable.

The display section 20 is coupled to the wearing base section 91 of the wearing belt 90. The display section 20 is an eyeglass type. The display section 20 includes a right holding section 21, a right display driving section 22, a left holding section 23, a left display driving section 24, a right optical-image display section 26, and a left optical-image display section 28.

The right optical-image display section 26 and the left optical-image display section 28 are located in front of the right eye and the left eye of the user when the user wears the display section 20. One end of the right optical-image display section 26 and one end of the left optical-image display section 28 are connected to each other in a position corresponding to the middle of the forehead of the user when the user wears the display section 20.

The right holding section 21 has a shape extending in a substantial horizontal direction from an end portion ER, which is the other end of the right optical-image display section 26, and inclining obliquely upward halfway. The right holding section 21 connects the end portion ER and a coupling section 93 on the right side of the wearing base section 91.

Similarly, the left holding section 23 has a shape extending in a substantial horizontal direction from an end portion EL, which is the other end of the left optical-image display section 28 and inclining obliquely upward halfway. The left holding section 23 connects the end portion EL and a coupling section (not shown in the figure) on the left side of the wearing base section 91.

The right holding section 21 and the left holding section 23 are coupled to the wearing base section 91 by left and right coupling sections 93 to locate the right optical-image display section 26 and the left optical-image display section 28 in front of the eyes of the user. Note that the coupling sections 93 couple the right holding section 21 and the left holding section 23 to be capable of rotating and capable of being fixed in any rotating positions. As a result, the display section 20 is provided to be capable of rotating with respect to the wearing base section 91.

The right holding section 21 is a member provided to extend from the end portion ER, which is the other end of the right optical-image display section 26, to a position corresponding to the temporal region of the user when the user wears the display section 20.

Similarly, the left holding section 23 is a member provided to extend from the end portion EL, which is the other end of the left optical-image display section 28 to a position corresponding to the temporal region of the user when the user wears the display section 20. The right display driving section 22 and the left display driving section 24 are disposed on a side opposed to the head of the user when the user wears the display section 20.

The display driving sections 22 and 24 include liquid crystal displays 241 and 242 (hereinafter referred to as "LCDs 241 and 242" as well) and projection optical systems 251 and 252 explained below. The configuration of the display driving sections 22 and 24 is explained in detail below.

The optical-image display sections 26 and 28 include light guide plates 261 and 262 and dimming plates explained below. The light guide plates 261 and 262 are formed of a light transmissive resin material or the like and guide image lights output from the display driving sections 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the right cord 42, the left cord 44, and the main body cord 48, for example, a metal cable or an optical fiber can be adopted.

The control section 10 is a device for controlling the HMD 100. The control section 10 includes an operation section 135 including an electrostatic track pad and a plurality of buttons that can be pressed. The operation section 135 is disposed on the surface of the control section 10.

Figure 2:
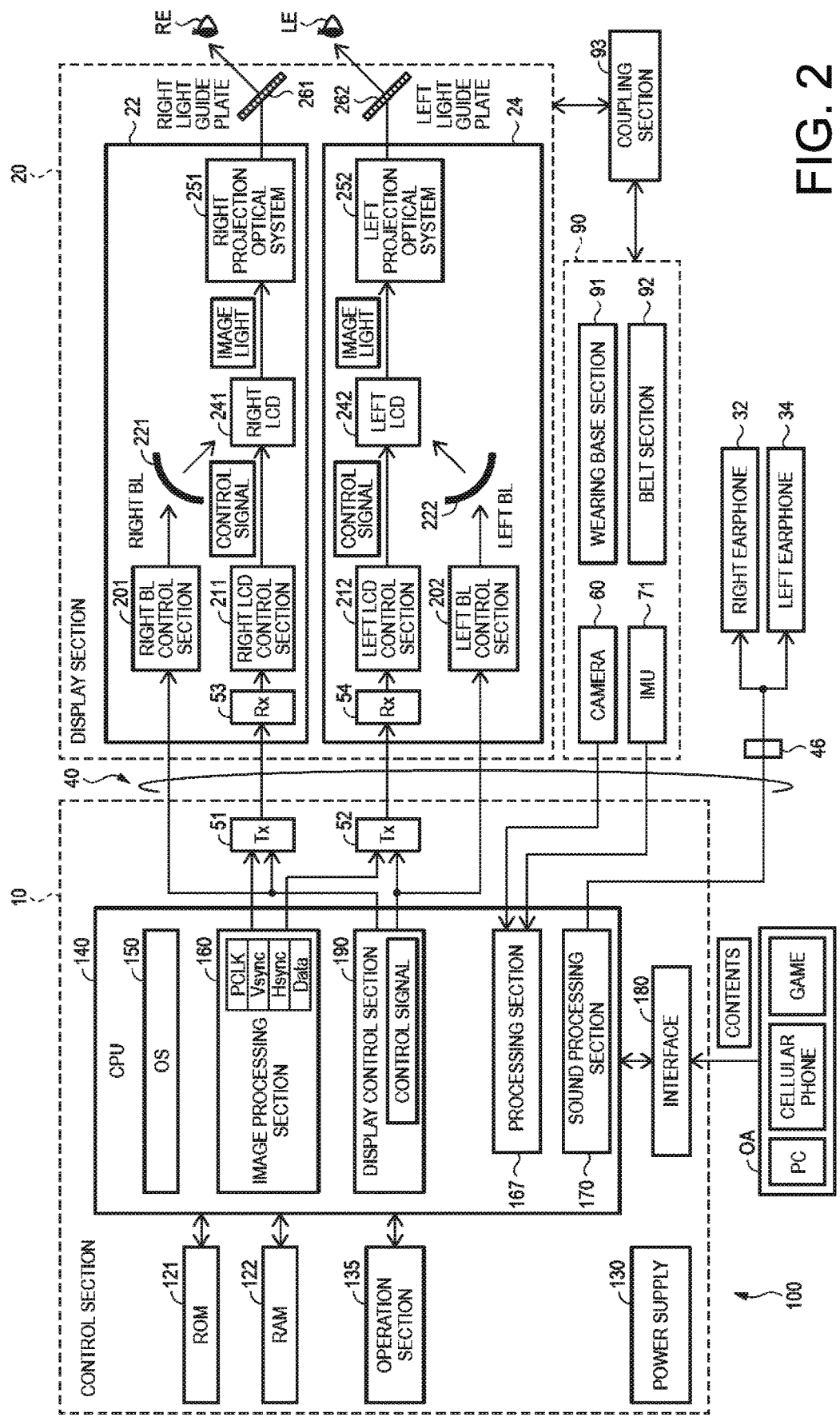
FIG. 2 is a block diagram illustrating a functional configuration of the HMD shown in FIG. 1.

FIG. 2 is a block diagram functionally showing the configuration of the HMD 100. As shown in FIG. 2, the control section 10 includes a ROM 121, a RAM 122, a power supply 130, the operation section 135, a CPU 140 (sometimes also referred to herein as processor 140), an interface 180, and a transmitting section 51 (Tx 51) and a transmitting section 52 (Tx 52).

The power supply 130 supplies electric power to the sections of the HMD 100. Various computer programs are stored in the ROM 121. The CPU 140 develops or loads, in the RAM 122, the computer programs stored in the ROM 121 to execute the computer programs. The computer programs include computer programs for realizing tracking processing and AR display processing explained below.

The CPU 140 develops, in the RAM 122, the computer programs stored in the ROM 121 to function as an operating system 150 (OS 150), a display control section 190, a sound processing section 170, an image processing section 160, and a processing section 167.

The display control section 190 generates control signals for controlling the right display driving section 22 and the left display driving section 24. The display control section 190 controls generation and emission of image lights respectively by the right display driving section 22 and the left display driving section 24.

The display control section 190 transmits control signals to a right LCD control section 211 and a left LCD control section 212 respectively via the transmitting sections 51 and 52. The display control section 190 transmits control signals respectively to a right backlight control section 201 and a left backlight control section 202.

The image processing section 160 acquires an image signal included in contents and transmits the acquired image signal to receiving sections 53 and S4 of the display section via the transmitting sections 51 and 52. The sound processing section 170 acquires a sound signal included in the contents, amplifies the acquired sound signal, and supplies the sound signal to a speaker (not shown in the figure) in a right earphone 32 and a speaker (not shown in the figure) in a left earphone 34 connected to the coupling member 46.

The processing section 167 acquires a captured image from the camera 60 in association with time. The time in this embodiment may or may not be based on a standard time. The processing section 167 calculates a pose of an object (a real object) according to, for example, a transformation matrix. The pose of the object means a spatial relation (a rotational and a translational relation) between the camera 60 and the object. The processing section 167 calculates, using the calculated spatial relation and detection values of acceleration and the like detected by the IMU 71, a transformation matrix for converting a coordinate system fixed to the camera 60 to a coordinate system fixed to the IMU 71. The function of the processing section 167 is used for the tracking processing and the AR display processing explained below.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USB interface, a micro USB interface, and an interface for a memory card can be used.

The display section 20 includes the right display driving section 22, the left display driving section 24, the right light guide plate 261 functioning as the right optical-image display section 26, and the left light guide plate 262 functioning as the left optical-image display section 28. The right and left light guide plates 261 and 262 are optical see-through elements that transmit light from real scene.

The right display driving section 22 includes the receiving section 53 (Rx53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driving section 22 may include a self-emitting display element such as an organic EL display element or may include a scan-type display element that scans a light beam from a laser diode on a retina. The same applies to the left display driving section 24.

The receiving section 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels is arranged in a matrix shape.

The right projection optical system 251 is configured by a collimate lens that converts image light emitted from the right LCD 241 into light beams in a parallel state. The right light guide plate 261 functioning as the right optical-image display section 26 guides the image light output from the right projection optical system 251 to the right eye RE of the user while reflecting the image light along a predetermined optical path. Note that the left display driving section 24 has a configuration same as the configuration of the right display driving section 22 and corresponds to the left eye LE of the user. Therefore, explanation of the left display driving section 24 is omitted.

The device to which the technology disclosed as an embodiment is applied may be an imaging device other than an HMD. For example, the device may be an imaging device that has no function of displaying an image.

Figure 3:
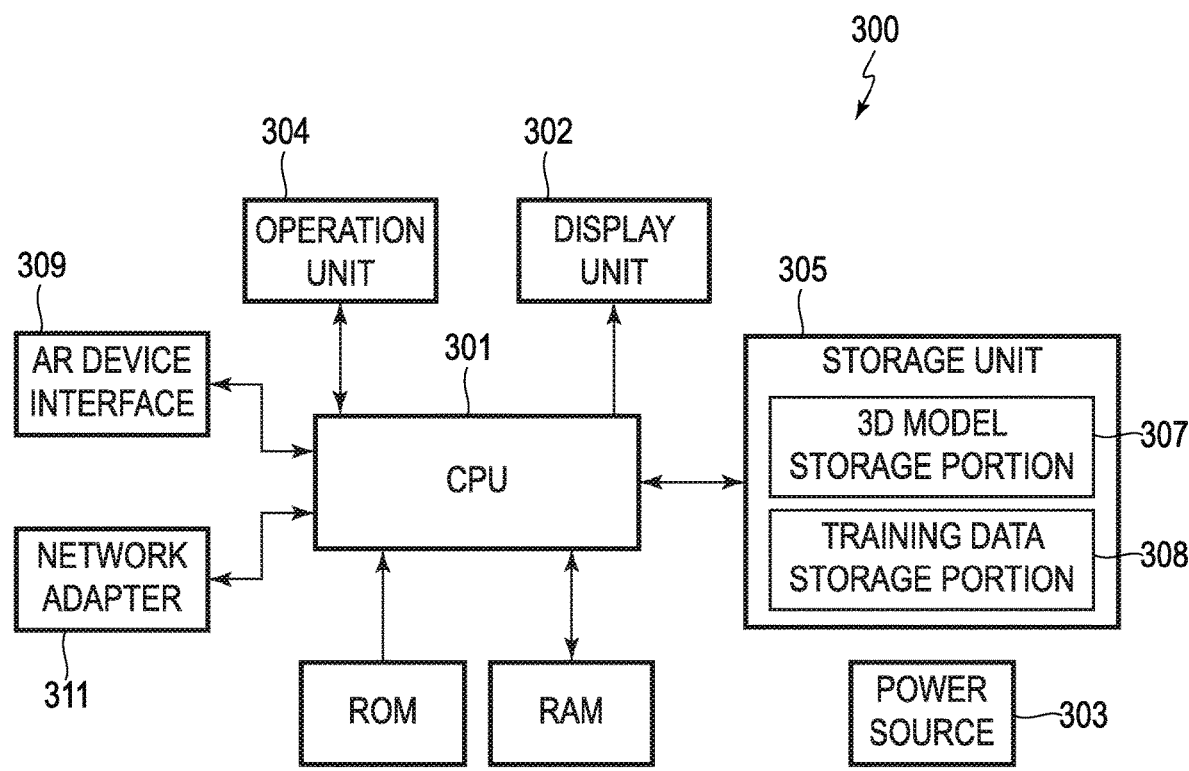
FIG. 3 is a block diagram illustrating a functional configuration of a computer for performing the methods of this disclosure.

FIG. 3 is a block diagram illustrating a functional configuration of a computer 300 as an information processing device in the present embodiment which performs the methods described herein. The computer 300 includes a CPU 301, a display unit 302, a power source 303, an operation unit 304, a storage unit 305, a ROM, a RAM, an AR interface 309 and a network adaptor 310. The power source 303 supplies power to each unit of the computer 300. The operation unit 304 is a user interface (GUI) for receiving an operation from a user. The operation unit 304 includes a keyboard, a mouse and a touch pad and the like and their driver software.

The storage unit 305 stores various items of data and computer programs, and includes a hard disk drive, a solid-state drive, or the like. The storage unit 305 includes a 3D model storage portion 307 and a template storage portion 308. The 3D model storage portion 307 stores a three-dimensional model of a target object, created by using computer-aided design (CAD) or other 3D reconstruction methods. The training data storage portion 308 stores training data created as described herein (not shown). The storage unit 305 also stores instructions (not shown) for execution by the CPU 301. The instructions cause the CPU 301 to perform the methods described herein. The AR interface 309 is an interface for communicative connection to an AR device. The AR interface may be any wired or wireless interface suitable for establishing a data connection for communication between the computer 300 and an AR device. The AR interface may be, for example, a Wi-Fi transceiver, a USB port, a Bluetooth® transceiver, a serial communication port, a proprietary communication port, or the like. The network adaptor 310 is configured to allow CPU 301 to connect to one or more networks to communicate with other computers, such as a server computer via a wireless network, so that, for example, the computer 300 receives from the other computer a computer program that causes the computer 300 to perform functions described in the embodiments described herein. In some embodiments, the AR device interface 309 and the network adaptor 310 are a single adaptor suitable for performing the tasks of both network adaptor 310 and AR device interface 309.

The CPU 301 reads various programs (also sometimes referred to herein as instructions) from the ROM and/or the storage unit 305 and develops the programs in the RAM, so as to execute the various programs. Suitable instructions are stored in storage unit 305 and/or the ROM and executed by the CPU 301 to cause the computer 300 to operate as a training computer to train the object detection algorithm as described herein. In some embodiments, the computer 300, with the appropriate programming, is a system for training an object detection algorithm using synthetic images. In other embodiments, the HMD 100 is the system for training an object detection algorithm using synthetic images. In still other embodiments, the system for training an object detection algorithm using synthetic images includes the computer 300 and the HMD 100.

The embodiments described herein relate to methods and systems for training an object detection algorithm using synthetic images, rather than actual images of a real-world object. As used herein, synthetic images generally refer to 2D images that are not created using a camera to capture a representation of a 3D scene. More specifically, with respect to training an object detection algorithm to detect a representation of a real-world 3D object in image frames captured by a camera, synthetic images are 2D images that are not created by a camera capturing a representation of the real-world 3D object. Synthetic images may be generated by capturing 2D images of a 3D model of an object in a computer (e.g., a 3D CAD model of an object), drawing (whether by hand or using a computer) a 2D image of the object, or the like. It should be noted that synthetic images include images of a synthetic image. For example, a photograph or scan of a synthetic image may itself be a synthetic image, in one embodiment. Conversely, images of an actual image, such as a photograph or scan of a photograph of the real-world 3D image, may not be synthetic images for purposes of this disclosure under one embodiment.

Figure 4:
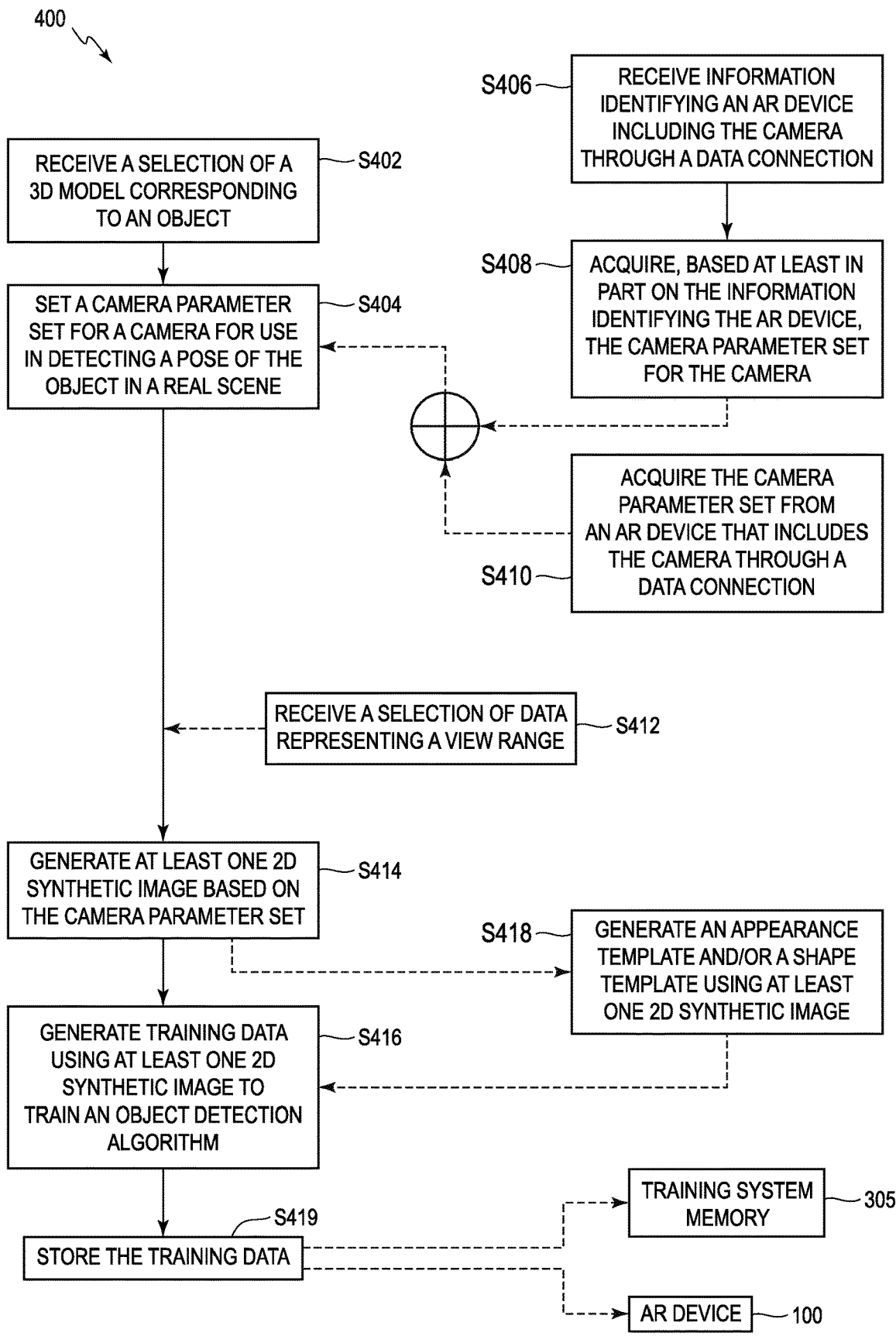
FIG. 4 is a flow diagram of an example method according to this disclosure.

FIG. 4 is a flow diagram of an example method 400 of training an object detection algorithm using synthetic images. The method 400 may be performed by computer 300 to train an object detection algorithm for use with the HMD 100 and will be described with reference to computer 300 and HMD 100. In other embodiments, the method 400 may be performed by a different computer (including, e.g., the control section 10), may be used to train an object detection algorithm for a different AR device, may be used to, and/or may be used to train an object detection algorithm for any other device that performs object detection based on image frames. To facilitate performance by a computer, the method 400 is embodied as instructions executable by one or more processors and stored in a non-transitory computer readable medium.

Initially, in S402, CPU 301 receives a selection of a 3D model stored in one or more memories, such as the ROM or the storage unit 305. The 3D model may correspond to a real-world object that the object detection algorithm is to be trained to detect in 2D image frames. In the example embodiment, the selection is received from a user, such as by a user selection through a GUI of the computer 300.

It is noted that a 3D model is discussed herein as being used to generate synthetic images in method 400. However, in some embodiments, a 3D model may not be required and instead, electronic data other than a 3D model (e.g., a 2D model, one or more 2D or 3D synthetic images, or the like) may be used in step S402. As such, for ease of description, the steps of method 400 (and other parts of the present disclosure) are described using a 3D model. However, the present disclosure is not limited to using a 3D model under step S402 and anywhere where a 3D model is referenced, it should be understood that some embodiments may relate to using electronic data other than a 3D model.

A camera parameter set for a camera, such as the camera 60, for use in detecting a pose of the object in a real scene is set in S404. The images captured by different cameras of the same real scene will typically differ at least somewhat based on the particular construction and components of each camera. The camera parameter set defines, at least in part, how its associated camera will capture an image. In the example embodiment, the camera parameter set may include the resolution of the images to be captured by the camera and camera intrinsic properties (or "camera intrinsics"), such as the X and Y direction focal lengths (fx and fy, respectively), and the camera principal points coordinates (cx and cy). Other embodiments may use additional or alternative parameters for the camera parameter set. In some embodiments, the camera parameter set is set by the user, such as by a user selection through a graphical user interface ("GUI") of the computer 300 (as is discussed later with regard to FIG. 5).

In some embodiments, the camera parameter set is set by the computer 300 without being selected by the user. In some embodiments, a default camera parameter set is set by the computer 300. The default camera parameter set may be used when the camera that will be used in detecting the pose of the object in the real scene is unknown or its parameters are unknown. The default camera set may include the parameters for an ideal camera, a popular camera, a last camera for which a camera parameter set was selected, or any other suitable camera parameter set. Moreover, some embodiments provide a combination of one or more of the above-described methods of setting the camera parameter set.

According to various embodiments, the camera parameter set (S404) can be set by many different ways, including by a computer retrieving a pre-stored model from a plurality of models pre-stored on a database, the computer receiving camera parameters from a connected AR device, and/or by a user directly entering (and/or modifying) into a GUI. However, the present application should not be limited to these specific embodiments. Nonetheless, the above embodiments are described herein below.

First, in some embodiments, setting the camera parameter set (S404) is performed by receiving information identifying a known AR device including the camera (S406). The information identifying the AR device is received from a user input, such as by selecting, through the computer's GUI, the AR device from a list of known AR devices. In other embodiments, the user may input the information identifying the AR device, such as by typing in a model name, model number, serial number, or the like.

The CPU 301 acquires, based at least in part on the information identifying the AR device, the camera parameter set for the camera (S408). The camera parameter set may be acquired from a plurality of the camera parameter sets stored in one or more memories, such as the storage unit 305 or a local or remote database. Each camera parameter set is associated in the one or more memories with at least one AR device of a plurality of different AR devices. Because multiple different AR devices may include the same camera, a single camera parameter set may be associated with multiple AR devices.

In some embodiments, setting the camera parameter in S404 includes acquiring the camera parameter set from AR device that includes the camera through a data connection when the AR device becomes accessible by the one or more processors (S410). For example, when the HMD 100 is connected (wired or wirelessly) to the AR device interface 309 of the computer 300, the CPU 301 may retrieve the camera parameter set from HMD 100 (stored, for example, in the ROM 121). In other embodiments, the computer 300 may acquire the camera parameter set from the AR device by determining the camera parameter set. For example, the computer 300 may cause the camera 60 in the HMD 100 to capture one or more image frames of, for example, a calibration sheet and the computer 300 may analyze the resulting image frame (s) to determine the camera parameter set. In still other embodiments, the computer 300 may retrieve from the AR device an identification of the AR device and/or the camera in the AR device and retrieve the appropriate camera parameter set from the one or more memories based on the retrieved identification. As mentioned above, the various techniques may be combined. For example, in some embodiments, if the AR device is available to the computer (e.g., it is connected to AR device interface 309), the camera parameter set is acquired from the camera, and if the AR device is not available to the computer the setting of S406 and S408 is performed.

Once the camera parameter set is set, the CPU 301 generates at least one 2D synthetic image based on the camera parameter set by rendering the 3D model in a view range (S414). The view range is the range of potential locations of the camera 60 around the stationary object for which images will be synthesized. In the example embodiment, the view range includes an azimuth component and an elevation component. The view range may also include a distance component that sets a distance of the potential locations in the view range from the 3D model of the object. The view range generally defines an area on the surface of a sphere having a radius equal to the length of the distance component. Each view point within the view range for which a synthetic image is generated represents a different pose of the object.

In some embodiments, the CPU 301 receives selection of data representing the view range (S412) before generating the at least one 2D synthetic image. The selection may be received, for example, from a user selection via a GUI, such as the GUI shown and discussed later for FIG. 5. In some embodiments, the GUI includes a preview view of the object and a graphical representation of the user selected view range. In some embodiments, the view range is a single pose of the object selected by the user. In other embodiments, the view range is a predetermined (e.g., a default) view range. Instill other embodiments, the CPU 301 utilizes the predetermined view range unless the user provides a different selection of the view range (or modification of the predetermined view range). In some embodiments the predetermined view range is less than 360 degrees around the object in one or more of the azimuth or elevation. The view range will be explained in more detail below with reference to FIGS. 5 and 6.

The CPU 301 generates at least one 2D synthetic image of the 3D model representing the view of the 3D model from a location within the view range. The number of 2D synthetic images to be generated may be fixed, variable, or user selectable. Any suitable number of images may be generated as long as at least one 2D synthetic image is generated. If a single 2D synthetic image is generated, the image is generated for a central point within the view range. If more than one image is generated, the images are generated relatively evenly throughout the view range. In some embodiments, if the number of views is fixed or set by the user, the computer 300 determines how far apart within the view range to separate each image to achieve some distribution of images within the view range such as an even distribution (e.g., so that each image is a view from a same distance away from the view of each adjacent image). In other embodiments, the computer 300 generates a variable number of images, based on the size of the view range and a fixed interval for the images. For example, the computer may generate an image from a viewpoint every degree, every five degrees, every ten degrees, every twenty degrees in azimuth and elevation within the view range. The intervals above are examples and any other suitable interval, including less than a full degree interval, may be used. The interval between images does not need to be the same for azimuth and elevation.

The computer 300 generates the at least one 2D synthetic image based on the camera parameter set that was set in S404. The camera parameter set alters the rendering of the 3D object for the view point of the image to replicate a real image of the real-world object taken from the same viewpoint. In this embodiment, a process of generating synthetic images uses a rigid body transformation matrix for transforming 3D coordinate values of 3D points represented in the 3D model coordinate system to ones represented in an imaginary camera coordinate system, and a perspective projection transformation matrix for projecting the transformed 3D coordinate values to 2D coordinate values on the virtual plane of the synthetic images. The rigid body transformation matrix corresponds to a viewpoint, or simply a view, and is expressed by a rotation matrix representing rotations around three axes which are orthogonal to each other, and a translation vector representing translations along the three axes. The perspective projection transformation matrix includes camera parameters, and is appropriately adjusted so that the virtual plane corresponds to an imaging surface of a camera, such as camera 60. The 3D model may be a CAD model. For each view, the computer 300 transforms and projects 3D points on the 3D model to 2D points on the virtual plane so that a synthetic image is generated, by applying rigid body transformation and perspective projection transformation to the 3D points.

In S416, the computer 300 generates training data using the at least one 2D synthetic image to train an object detection algorithm. The training data based on the synthetic image may be generated using any technique suitable for use with real images. In some embodiments, generating the training data includes generating an appearance template and/or a shape template using the 2D synthetic image (S418). The appearance template includes one or more features such as color, surface images or text, corners, and the like. The appearance template may include, for example, coordinate values of the locations of features of the object in the 2D synthetic image and their characterization, the coordinates of locations on the 3D model that correspond to those 2D locations, and the 3D model in the pose for which the 2D image was generated. The shape template describes the shape of the object in two dimensions without the surface features that are included in the appearance template. The shape template may include, for example, coordinate values of points (2D contour points) included in a contour line (hereinafter, also simply referred to as a "contour") representing an exterior of the object in the 2D synthetic image, the points on the 3D model that correspond to the 2D contour points, and the 3D model in the pose for which the 2D image was generated. In some embodiments, separate shape and appearance templates are created for each synthetic image generated for the view range. In other embodiments, data for multiple images may be stored in a single template.

The generated training data is stored in one or more memories (S419). In some embodiments, the training data is stored in the computer's training system memory 305. In some embodiments, when the HMD100 is communicatively coupled to the computer 300 through the AR device interface 309, the training data is stored by the computer 300 in the memory (such as ROM 121) of the HMD 100. In other embodiments, the training data is stored in the computer's training system memory 305 and the HMD 100.

After the training data is stored in the HMD 100, the HMD 100 may operate to detect the object based on the training data. In some embodiments, the HMD attempts to detect the object in image frames of a real scene captured by the camera 60 by attempting to find a match between the template(s) and the image using the HMD's object detection algorithm.

In some embodiments, training data is generated for multiple cameras and/or AR devices for use in detecting a pose of the object in a real scene. In some such embodiments, setting the camera parameter set in S404 includes setting a plurality of camera parameter sets for a plurality of cameras, S414 includes generating a plurality of 2D synthetic images based at least on the plurality of camera parameter sets, and S416 includes generating training data using the plurality of 2D synthetic images to train an object detection algorithm for a plurality of AR devices having the plurality of cameras. In other embodiments, steps S404, S414, and S416 (optionally including one or more of S406, S408, S410, S412, and S418) are simply repeated multiple times, each time for a different camera.

Figure 5:
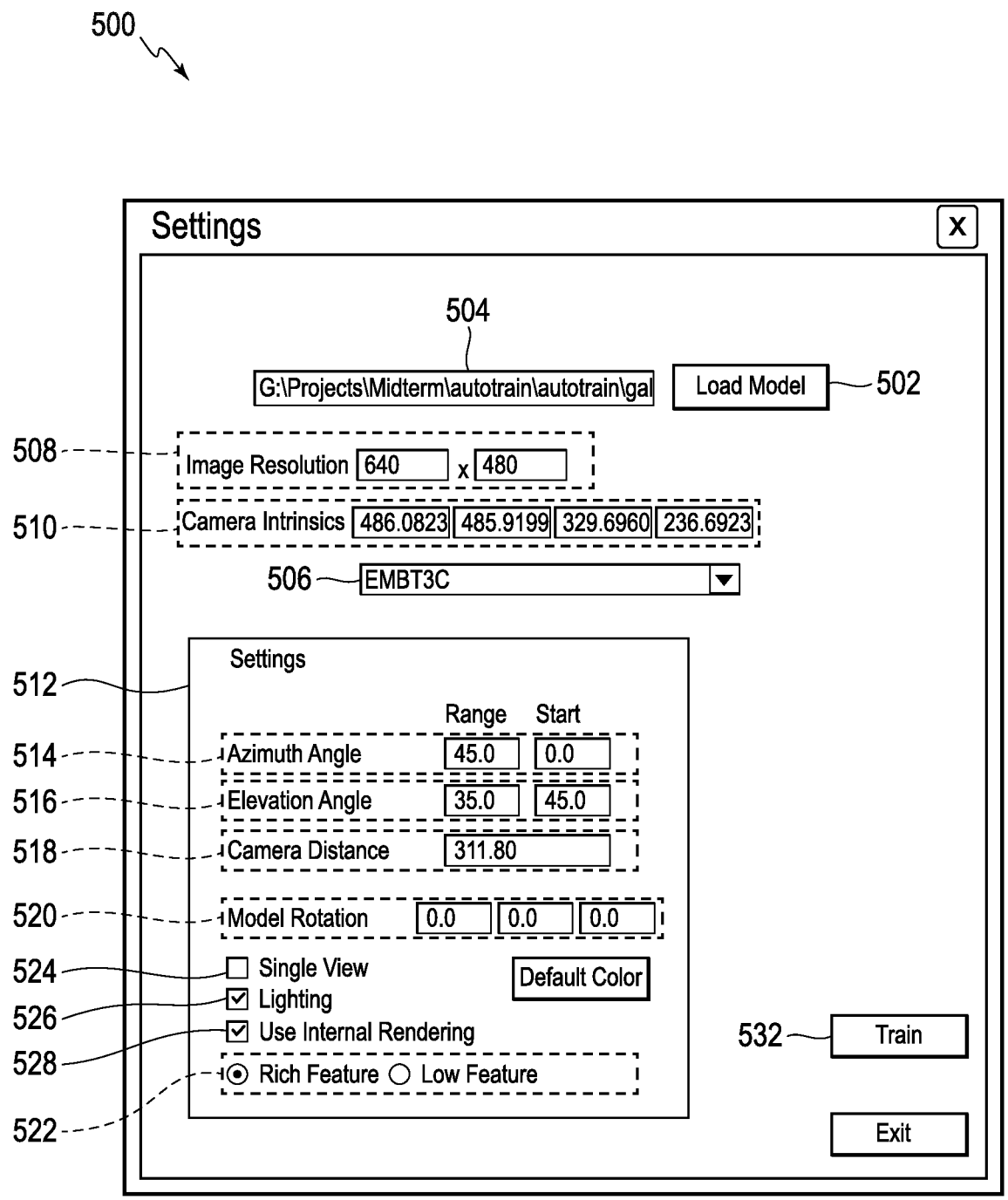
FIG. 5 is an input window of a graphic user interface (GUI) for use with some example methods of this disclosure.
Figure 6:
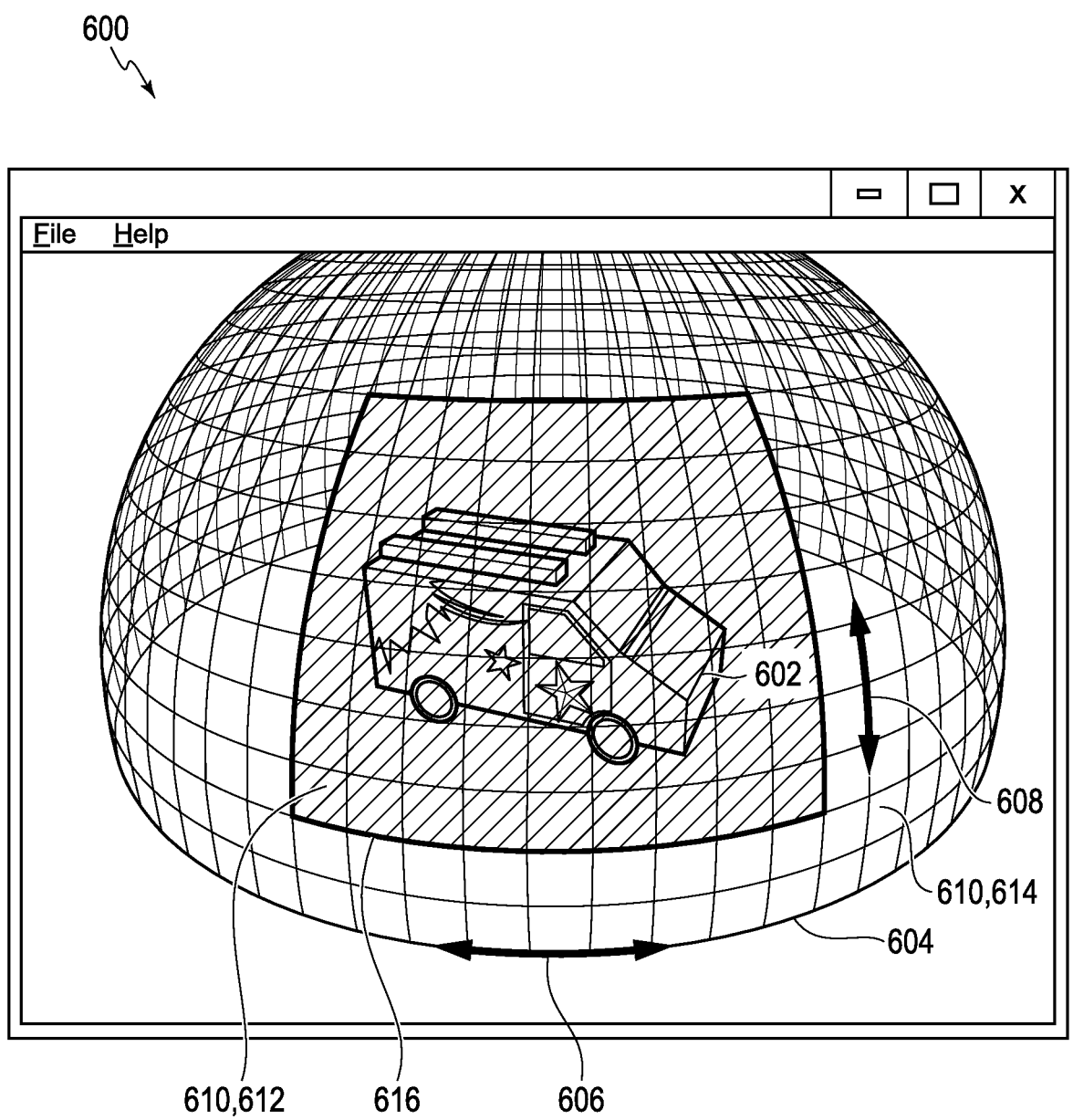
FIG. 6 is a preview window associated with the GUI input window shown in FIG. 5.

As mentioned above, in some embodiments, the computer performing the method 400 includes a GUI for providing information to and receiving selections from a user. FIGS. 5 and 6 are images of a GUI that may be used as part of a system that implements method 400. For example, the GUI may be displayed by the computer 300 on the display unit 302 and be responsive to user input via the operation unit 304. FIG. 5 is a GUI 500 for receiving input from the user, and FIG. 6 is a preview window 600 displaying a 3D model 602 of the object to assist in selection and/or preview of the view range. While the GUI shown in FIGS. 5 and 6 will be described with reference to the method 400, it should be understood that the method 400 may be performed without using the GUI of FIGS. 5 and 6, and the GUI shown in FIGS. 5 and 6 may be used to perform training with methods other than the method 400.

Turning initially to FIG. 5, the GUI 500 includes a model loading button 502 and a selected model display field 504 used to implement S402 of the method 400. In the example embodiment, when the user selects the model loading button 502, another window is opened to allow the user to browse to the location (on the computer 300, database or other storage location (whether local or remote)) at which a 3D model to be selected for training is located. The selected model display field 504 displays the location of the selected model, if a model has been selected. In some embodiments, the user may select the model by typing the location directly into the selected model display field 504. Moreover, in some embodiments, the user may select the model by any other suitable technique, including by dragging and dropping the model into the GUI 500.

The camera parameter set may be set in S404 by selecting the AR device for which the object detection algorithm is to be trained in AR device selection field 506. In the illustrative embodiment of FIG. 5, the AR device selection field 506 is a "pull down menu" or "drop down menu." When the user selects the field 506, a list of known AR devices is pulled down for selection by the user. In some embodiments, the AR device may be selected by detection by the computer 300 (for example as described in S410). Based on the detected/selected AR device, the computer 300 retrieves the camera parameter set for the camera included in the AR device. The resolution and camera intrinsic parameters for the camera included in the AR device in field 506 are displayed in resolution field 508 and intrinsics field 510. The resolution and camera intrinsic parameters collectively form the camera parameter set in this embodiment.

In some embodiments, the user may directly manually enter the camera parameters into the intrinsics field 510 and/or the resolution field 508 without having to complete step S402 by specifying a number of already existing synthetic images. Also, the user may be allowed to modify the camera parameters that were inputted into the intrinsics field 510 and/or the resolution field 508 by the computer. Moreover, in some embodiments, the user may associate an entered/modified camera parameter set with a particular AR device or camera and store the new camera parameter set for future use.

A settings portion 512 of the GUI 500 allows the user to set and/or review the settings for generating synthetic images of the object 602 and training the object detection algorithm. The settings portion includes an azimuth setting section 514, an elevation setting section 516, a camera distance section 518, a model rotation section 520, a single view selector 524, a lighting selector 526, an internal rendering selector 528, and a feature level selector 522.

The settings portion 512 will be described with additional reference to FIG. 6. Model rotation section 520 allows the user to select the rotation of the model 602 of the object in three dimensions. In the example embodiment, the default rotation of the model is the rotation of the model 602 as stored in the model file. The model 602 is displayed in the preview window 600 according to the model rotation displayed in the model rotation section 520. To change the rotation of the model, the user may numerically enter the rotation in the model rotation section 520 or rotate the model 602 in the preview window 600, such as by selecting and dragging the model to rotate it (using a mouse, a user's finger on a touchscreen, or the like). The camera distance section 518 allows the user to set the distance from the model to the camera for which images will be synthesized. In some embodiments, the camera distance can also be modified by using the scroll wheel on a mouse to zoom in/out, or by any other suitable control.

The model 602 is displayed in the preview window 600 oriented according to the rotation selection and the camera distance selection, and it is partially surrounded by a mesh 604. The mesh 604 defines a portion of a sphere around the model 602, with the model 602 located at the center of the sphere. In some embodiments, the mesh 604 defines a full sphere around the model 602. The mesh 604 is a visual aid to assist with visualizing the view range for creation for the synthetic images. The mesh includes elevation lines 608 and azimuth lines. Each azimuth line traces three hundred and sixty degrees in the azimuth direction 606 for a particular elevation. Similarly, each elevation line traces up to three hundred and sixty degrees in the elevation direction 608 for a given azimuth. In the illustrated example, the mesh 604 is not a full sphere and the elevation lines trace less than a full three hundred and sixty degrees. The azimuth and elevation lines define grid sections 610. The grid sections 610 include selected grid sections 612 and unselected grid sections 614. The selected grid sections 612 form the view range 616. The view range 616 is the range of camera locations or orientations for which synthetic images are generated. The user may select the view range by selecting grid sections 610 in the preview window or by entering the view range numerically in the azimuth setting section 514, the elevation setting section 516 of the window 500. If the user enters the view range numerically, the appropriate grid sections 610 will be selected in the preview window 600. Conversely, if the user selects (or unselects) grid sections 610 in the preview window 600, the numerical representation in the input window 500 will be correspondingly updated.

In some embodiments, the view range 616 is preset. A default/preset view range may be fixed (i.e., not user changeable) in some embodiments. In other embodiments, the default/preset view range is changeable by the user. In an example embodiment, a default view range 616 is set with a range of sixty degrees of azimuth and forty five degrees of elevation.

Returning to FIG. 5, the single view selector 524 allows the user to select to synthesize a single view of the model 602. If the single view selector 524 is not selected, multiple views of the model 602 are generated based on the selected view range. The lighting selector 526 allows the user to select whether or not lighting should be simulated when generating the synthetic images. The internal rendering selector 528 allows the user to select whether or not internal rendering should be used when generating the synthetic images.

The feature level selector 522 is used to indicate whether the model 602 is a rich feature object or a low feature object, which facilitates training the object detection algorithm. For example, the model 602 includes surface features 618 with distinct color, contrasts, shapes, etc. that may be used for object detection and tracking. Accordingly, rich feature is selected in the feature level selector 522 and the object detection algorithm will be trained to detect such features by, for example, creation of one or more appearance templates. If the model 602 did not include surface features 618, or if the user did not want to use such features, low features would be selected in the feature level selector 522 and the object detection algorithm will be trained to detect the object without using surface features, such as by using a shape template.

When the user is ready to train the detection algorithm, the user selects the train button 532. In response, the computer 300 generates the synthetic image(s) according to the settings the user selected (or the defaults), generates training data to train the object detection algorithm based on the synthetic image(s), and stores the training data. The stored training data is ready to be used by the AR device to detect and track the object and the user can proceed to train the algorithm for a different object or to train the algorithm to detect the same object using a different AR device.

The various embodiments described herein provide a system for auto-training an object detection algorithm using synthetic images. The embodiments reduce the amount of user involvement in training the algorithm, remove the time and effort needed to capture multiple images of an actual object using each particular AR device to be trained to detect the object, and remove the need to have an actual copy of the object and the AR device to be trained.

Some embodiments provide a non-transitory storage medium (e.g. ROM 121, RAM 122, identification target storage section 139, etc.) containing program instructions that, when executed by a computer processor (e.g. CPU 140, processor 167, CPU 301), perform the methods described herein.

Although the invention has been described with reference to embodiments herein, those embodiments do not limit the scope of the invention. Modifications to those embodiments or different embodiments may fall within the scope of the invention.

What is claimed is:

1. A non-transitory computer readable medium that embodies instructions that cause one or more processors to perform a method comprising:
   (A) receiving a selection of a 3D model stored in one or more memories, the 3D model corresponding to an object;
   (B) setting a camera parameter set for a camera for use in detecting a pose of the object in a real scene by:
   receiving information identifying an object detection device including the camera,
   acquiring, based at least in part on the information identifying the object detection device, the camera parameter set for the object detection device from a plurality of the camera parameter sets stored in one or more memories, wherein each camera parameter set of the plurality of camera parameter sets is associated in the one or more memories with at least one object detection device of a plurality of different object detection devices; and
   (C) generating at least one 2D synthetic image based at least on the camera parameter set by rendering the 3D model in a view range for generating training data.

2. The non-transitory computer readable medium according to claim 1, wherein the object detection device is a head-mounted display device including the camera.

3. The non-transitory computer readable medium according to claim 1, wherein:
   (B) includes: setting a plurality of camera parameter sets for a plurality of cameras for use in detecting a pose of the object in a real scene; and
   (C) includes: generating a plurality of 2D synthetic images based at least on the respective camera parameter sets by rendering the 3D model in the view range.

4. The non-transitory computer readable medium according to claim 1, further comprising receiving, before (C), a selection of data representing the view range.

5. The non-transitory computer readable medium according to claim 1, wherein the view range comprises a predetermined view range covering equal to or less than 360 degrees of azimuth and elevation.

6. The non-transitory computer readable medium according to claim 1, wherein the method further comprises:
   (D) receiving, via a graphical user interface, a selection of data representing the view range.

7. The non-transitory computer readable medium according to claim 6, wherein (D) comprises receiving the selection of data representing the view range from a user selection on a graphical user interface including a preview view of the object and a graphical representation of the user selected view range.

8. A non-transitory computer readable medium that embodies instructions that cause one or more processors to perform a method comprising:
   (A) receiving a selection of a 3D model stored in one or more memories, the 3D model corresponding to an object;
   (B) setting a camera parameter set for a camera for use in detecting a pose of the object in a real scene by: acquiring, through a data connection, the camera parameter set from an object detection device having the camera when the object detection device becomes accessible by the one or more processors through the data connection; and
   (C) generating at least one 2D synthetic image based at least on the camera parameter set by rendering the 3D model in a view range for generating training data.

9. The non-transitory computer readable medium according to claim 8, wherein the object detection device is a head-mounted display device including the camera.

10. The non-transitory computer readable medium according to claim 8, wherein:
    (B) includes: setting a plurality of camera parameter sets for a plurality of cameras for use in detecting a pose of the object in a real scene; and
    (C) includes: generating a plurality of 2D synthetic images based at least on the respective camera parameter sets by rendering the 3D model in the view range.

11. The non-transitory computer readable medium according to claim 8, further comprising receiving, before (C), a selection of data representing the view range.

12. The non-transitory computer readable medium according to claim 8, wherein the view range comprises a predetermined view range covering equal to or less than 360 degrees of azimuth and elevation.

13. The non-transitory computer readable medium according to claim 12, wherein (D) comprises receiving the selection of data representing the view range from a user selection on a graphical user interface including a preview view of the object and a graphical representation of the user selected view range.

14. The non-transitory computer readable medium according to claim 8, wherein the method further comprises:
    (D) receiving, via a graphical user interface, a selection of data representing the view range.

* * * * *